(No Model.)
J. I. MAYFIELD.
SEED PLANTER.
No. 412,642. Patented Oct. 8, 1889.
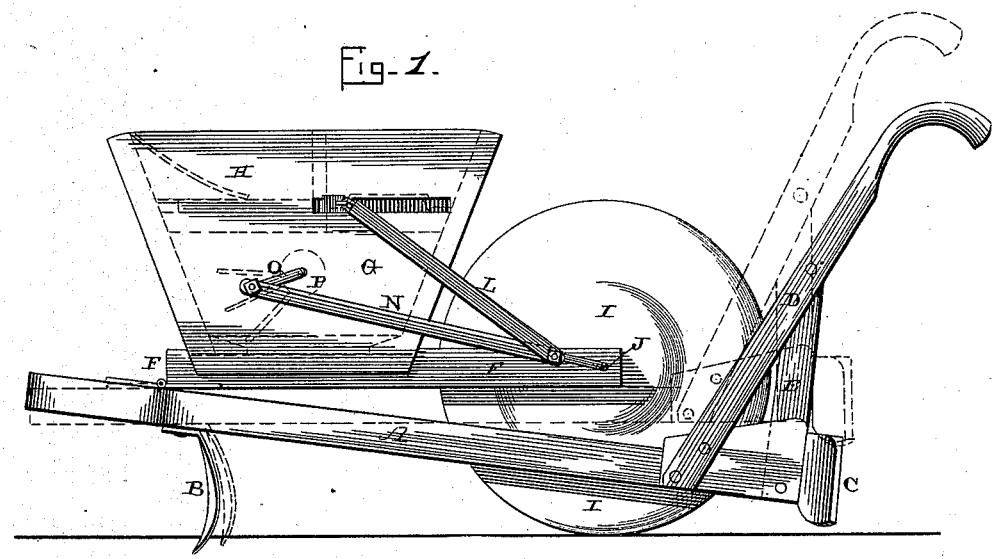
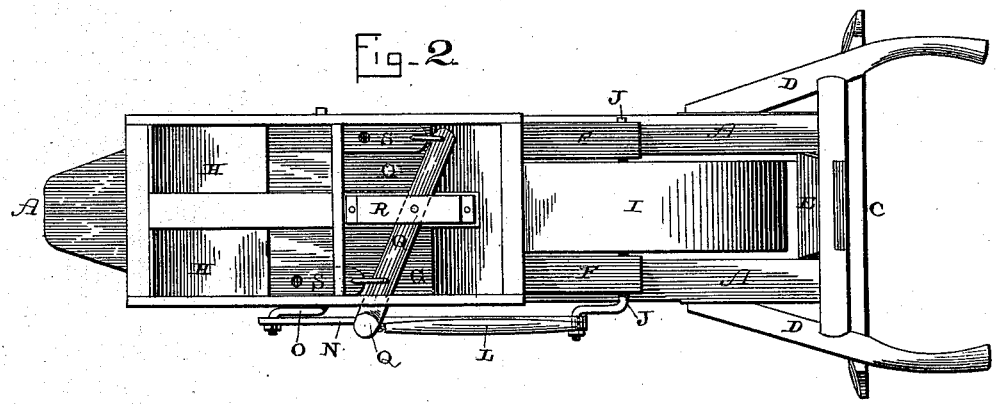
Witnesses:
E. P. Ellis,
L. L. Burket.
Inventor:
Jas. I. Mayfield,
per F. A. Lehmann,
atty.

UNITED STATES PATENT OFFICE.

JAMES I. MAYFIELD, OF KOSCIUSKO, MISSISSIPPI.

SEED-PLANTER.

SPECIFICATION forming part of Letters Patent No. 412,642, dated October 8, 1889.

Application filed July 22, 1889. Serial No. 318,303. (No model.)

*To all whom it may concern:*

Be it known that I, JAMES I. MAYFIELD, of Kosciusko, in the county of Attala and State of Mississippi, have invented certain new and useful Improvements in Seed-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in seed-planters; and it consists in the combination of the frame with pivoted bars, in the rear end of which the driving-wheel is journaled, the seed-box secured to the bars, and a separate operating-mechanism for each seed-box, as will be more fully described hereinafter.

The object of my invention is to pivot all of the operating parts of the planter to the front end of the frame, so as to leave them free to rise and fall in relation to the frame, and thus enable the covering device to be forced downward, so as to cover the seed to any desired depth.

Figure 1 is a side elevation of a planter which embodies my invention, the parts being shown in one position in solid lines, and in another position in dotted lines. Fig. 2 is a plan view.

A represents the frame of the planter, which is of ordinary construction, and is provided with the furrow-opener B near its front end, and the covering device C at its rear end. To the rear end of this frame are secured the handles D and the brace E, by which they are held in position.

Hinged or pivoted upon the top of the frame A, near its front ends, are the two bars F, which have the seed-boxes G H secured to their front ends and the driving-wheel I journaled in their rear ends. The shaft J of the wheel I is provided with a crank at one end, and to this crank are loosely connected the two operating-rods L N. The rod N extends almost parallel with the bars F, and is connected at its front end to the crank O on the stirrer-shaft, which extends horizontally through the box G. To this shaft is secured an ordinary stirrer P, (shown in dotted lines,) which serves to force the seed from the box G through the slot in its bottom in the usual manner. Cotton-seed or peas can be placed in this box G, and the stirrer will cause them to drop at regular distances apart.

The rod L extends upward at a suitable angle and is fastened to the outer end of the lever Q, which is pivoted upon a suitable support R, which projects outward from the rear end of the box H. The box H is divided into two compartments, and in the bottom of each compartment is placed a seed-slide S, which are connected to and operated by the lever Q. As the wheel I is made to revolve, the two rods L N operate both the stirrer P and the slides S at the same time. If corn and peas are to be planted together, the corn will be placed in the box H and the peas placed in the box G, and then they will be planted in alternate hills. If cotton-seed alone is to be planted, then the box H and its attachments will be removed from the box G.

The furrow-opener B opens the furrow into which the seed drops, and the wheel I runs upon the top of the seed, so as to compress the earth around them, and the covering device C serves to force the earth upon them. As the seed-box and the wheel I move with the bars F, and as the bars are loosely hinged or pivoted to the front of the frame, the pressure of the wheel I against the ground serves to raise the rear ends of the bars above the frame A, and thus allows the covering device to sink toward the earth to any desired degree. By this construction the operator is enabled to cover the seed to a greater or less degree, as may be desired.

Having thus described my invention, I claim—

The combination of the frame A, furrow-opener B, and coverer C with the bars F, hinged or pivoted at their front ends, the seed-boxes G H, the operating-wheel journaled in the rear ends of the bars, the crank-shaft J, the connecting-rods L N, the lever Q, seed-slides S, and stirrer P, substantially as described.

In testimony whereof I affix my signature in presence of two witnesses.

JAMES I. MAYFIELD.

Witnesses:
J. Q. BUCK,
JOHN B. COLE.